UNITED STATES PATENT OFFICE.

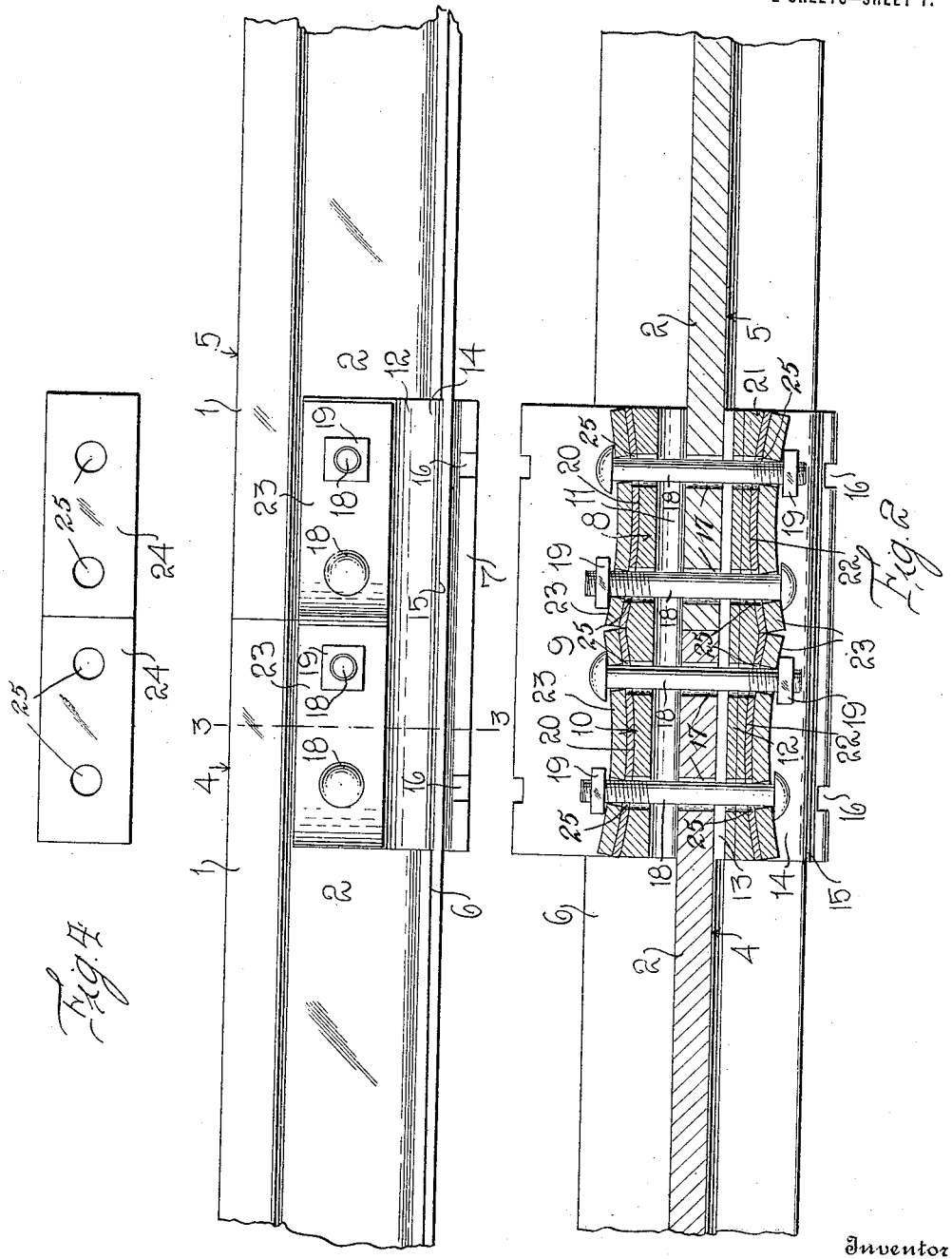

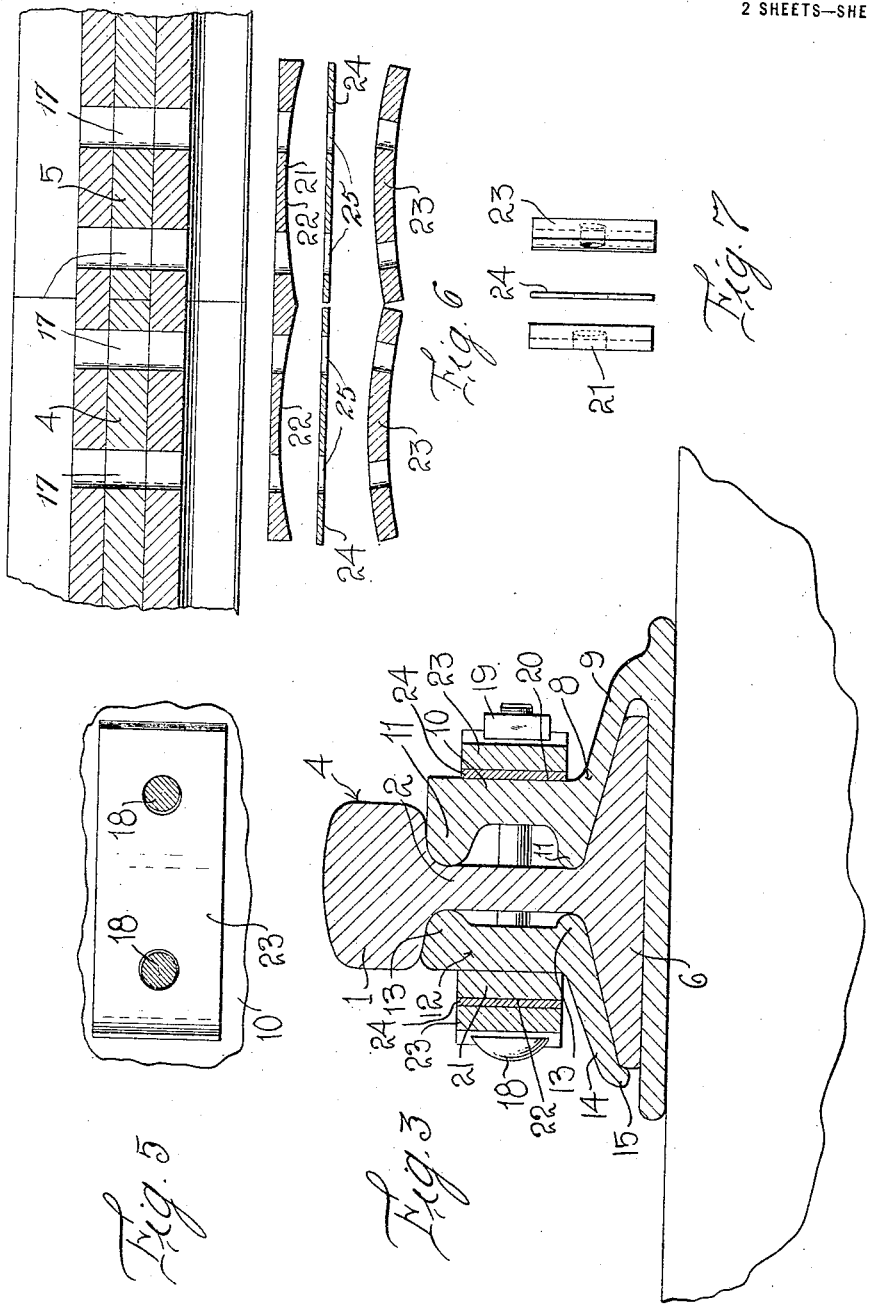

CHARLES ANDREW BELLE ISLE, SR., OF ATLANTA, GEORGIA.

RAIL-JOINT.

1,238,146.  Specification of Letters Patent.  Patented Aug. 28, 1917.

Application filed February 27, 1917. Serial No. 151,262.

*To all whom it may concern:*

Be it known that I, CHARLES ANDREW BELLE ISLE, Sr., a citizen of the United States, residing at Atlanta, in the county of Fulton and State of Georgia, have invented new and useful Improvements in Rail-Joints, of which the following is a specification.

This invention although directed generically to rail-joints, comprehends more specifically a chair and fish-plate construction, possessing the necessary requisites to insure stability of rail-relation under the various stresses produced by rolling stock, climatic conditions, and otherwise.

The fundamental purpose of this invention is to effect a redesigning of rail-joints embodying a chair, opposed interconnected fish-plates, and an elastic filler block, by providing a similar organization affording maximum strength and efficiency, economy in construction, and better distribution of the load.

Another important feature of this joint, resides in the relative curvature of certain of its component surfaces in order to impart a similar curvature to resilient filler-plates interposed there-between, whereupon elements retaining the joint in assembled condition may be frictionally engaged, and accidental displacement, the cause of many railroad mishaps, avoided.

Additional advantages of this invention are, elimination of the usual wood filler-block, and substitution of spring-plates; a construction of comparatively few parts, affording a more uniform reinforcement of the rail to prohibit movement laterally or vertically; while at the same time, providing a structure readily set up and adjusted by unskilled trackmen; reliable locking means to prevent backing off of the nuts, in consequence of which, the frequent inspection now found to be essential may be partially, at least, dispensed with; and adaptability of the nut locking structure to the principal forms of rail-joints now in use.

With these and other objects in view, my invention consists in certain novel features of construction, combination and arrangement of parts hereinafter to be set forth and claimed.

Referring more particularly to the accompanying drawings, in which corresponding parts are indicated by similar reference characters:

Figure 1 is a side elevation illustrating my improved joint operatively positioned upon the abutting ends of a pair of rails.

Fig. 2 is a horizontal section with the parts assembled as shown in Fig. 1.

Fig. 3 is a transverse vertical section taken on the line 3—3 of Fig. 1.

Fig. 4 is a detail view of the spring-plates.

Fig. 5 is another detail view partly in section, illustrating one of the anchoring plates applied to the curved surface of the fish-plate, a fragment of which is shown.

Fig. 6 is a horizontal section, illustrating a fragment of two abutting rails equipped with ordinary fish-plates; a portion of the joint bolt and nut locking means being shown disassembled and ready to be applied thereto.

Fig. 7 is an end view of the bolt and nut locking means shown disassembled in the preceding figure.

Ordinarily in rail-joint construction utilizing a chair with opposed fish-plates, it has been deemed expedient to interpose a compressible or resilient filler between one of the fish-plates and the upright or bolt-plate of the rail-chair, to prevent displacement of parts, but usage has demonstrated that notwithstanding these precautionary measures, extreme care in the way of frequent inspection must be exercised, otherwise, under the undue stress produced by heavy traffic, one or more elements of the joint are loosened, with a consequent lateral or vertical movement of the rail; it is therefore, the aim of this invention to materially avoid these defects by designing a rail-joint, wherein the bolt-plate of the rail-chair subserves the function of one of the usual fish-plates, thus dispensing with an intermediate prone to become disarranged, as well as providing a unitary structure to securely reinforce one side of the rail. Moreover, to further assist in maintaining the parts in operative relation certain of its surfaces are curved and adapted to coöperate with similarly curved anchor-plates, which when pressed outward by suitably interposed spring-plates, frictionally engage the bolts and their accompanying nuts to prevent dislodgment of the former and backing off of the latter.

In the illustrated embodiment characterizing this invention, 1 and 2 indicate the head and web of meeting rails 4 and 5, the flanges 6 of which rest upon base 7, of rail-chair 8. An offset 9, integral with the base 7 and extending inwardly at an incline thereover effects in conjunction with said base a wedge shaped housing for a portion of the rail flanges 6.

To eliminate one of the usual fish-plates, offset 9, is formed with a thickened vertical prolongation 10, having upper and lower beads 11, designed to fit snugly beneath the heads of the rails and in the angle of their flanges. As the portion 10 subserves the function of a fish-plate, it will hereinafter for the sake of convenience be referred to as such.

Opposing fish-plate 10, on the inner side of the rails, is positioned a fish-plate 12, provided with beads 13 and an outwardly and downwardly inclined flange engaging foot 14, formed with a depending extension 15, adapted to take over the outer edge of the rail flanges. With this construction, as the fish-plates are drawn together a strong upward pressure is obtained beneath the rail heads, and a firm downward pressure upon the flanges, which insures absolute stability of the rails, and also prevents twisting of the heads.

In order to suitably anchor chair 8, its base 7 is formed with spiking notches 16, arranged as clearly shown in Fig. 2 of the drawings. Extending through registering openings 17 in webs 2, and fish-plates 10 and 12, are bolts 18, which are retained in position by the usual nuts 19.

Coming now to another phase of this invention, namely, the nut and bolt locking means, it will be observed to effectively accomplish this end, fish-plate 10, is formed with adjoining concaved surfaces 20, curving in the plane of its longitudinal axis; while the opposite plate 12 is provided with an abutting packing bar 21, also having adjoining surfaces 22, which, when bar 21 is in position will be disposed coincident with those first mentioned. Metallic anchoring plates 23, of more or less resiliency and conforming in outline to the curvature of surfaces 20 and 22, coöperate with the latter to depress spring-plates 24 interposed between said surfaces and the anchoring plates for a purpose hereinafter to appear.

To accommodate passage of bolts 18, packing bar 21, anchoring plates 23, and spring-plates 24, are respectively provided with suitably spaced openings 25 adapted to aline with those in fish-plates 10 and 12.

Having previously set forth the various elements of this joint, it now remains to describe their application which is as follows: After properly anchoring chair 8, the flanges of rails 4 and 5 are seated in the tapered housing formed by offset 9 and base 7 as shown in Fig. 3. Then, fish-plate 12, packing bar 21, anchoring plates 23, and spring-plates 24, being operatively positioned as above stated, bolts 18 are passed through their openings and threaded with nuts 19, and as these are tightened, the parts will be drawn together until they assume the position shown in Fig. 2 of the drawings, at the same time, spring-plates 24 being pressed into the curved surfaces 20 and 22 by the anchoring plates coöperating therewith. Depressing the central portion of spring-plates 24 causes their extremities to bear outwardly against the aforesaid anchoring plates, which in turn are pressed outwardly against the inner surfaces of nuts 19 to securely retain the same in adjusted position. In this connection, by alternating the position of the bolt-heads the tension is better apportioned. Additionally, the edges of the walls surrounding the bolt openings in said spring and anchoring plates frictionally engage the bolts, whereupon any movement on their part is prevented.

Thus, by the preceding arrangement, an effective nut and bolt locking means is provided which materially lessens the danger usually accompanying the use of the old type of rail-joint.

In conclusion, among the manifold advantages hereinbefore mentioned, another distinctive feature of this invention resides in its ready adaptability to any type of joint now in use, as for instance, if found desirable, a portion of the joint composed of the packing bar 21, spring-plates 24, and anchoring plates 23, shown in Fig. 6, may be used separately, and substituted for the usual fish-plates, or on the other hand, they may be employed in conjunction with the latter, depending on the exigency of the situation. In any event, without necessitating a material alteration of structure, an efficient bolt and nut lock may be applied to any standard joint.

Although in the foregoing, certain elements have been set forth as best adapted to perform the functions allotted to them, nevertheless, variations in the dimensions of the plates, their temper, etc., may be modified without departing from or sacrificing any of the principles of this invention.

Having now described my invention what I claim is:

1. In a rail-joint, a uniting element having a concave seat, a similarly curved anchoring plate coöperating therewith, and an interposed spring member coöperating with said anchor plate, as described.

2. In a rail-joint, a uniting element exteriorly formed with a longitudinally extending concave seat, a similarly curved anchoring plate coöperating therewith, and an interposed spring member coöperating with said anchor plate, as described.

3. In a rail-joint, a uniting element exteriorly formed with adjoining and longitudinally extending concave seats, a similarly curved anchoring plate coöperating therewith, and an interposed spring member coöperating with said anchor plate, as described.

4. In a rail-joint, the combination with the meeting ends of a pair of rails; of a uniting element having adjoining concave surfaces, curving in the plane of its longitudinal axis, correspondingly curved anchoring plates co-acting with said surfaces, and spring members interposed between said plates and concave surfaces, as described.

5. In a rail-joint, the combination with the meeting ends of a pair of rails; of oppositely positioned uniting elements exteriorly formed with longitudinally extending concave seats arranged in coincident relation, correspondingly curved anchoring plates co-acting with said seats and spring members positioned intermediate said plates and their seats, as described.

6. In a rail-joint, the combination with the meeting ends of a pair of rails; of opposed uniting elements bridging their joint and exteriorly formed with adjoining concaved seats, correspondingly curved anchoring plates coöperating with said seats, spring members situated intermediate said seats and anchoring plates, as described.

7. In a rail-joint, the combination with the meeting ends of a pair of rails; of opposite uniting elements bridging their joint and formed exteriorly with longitudinally extending concaved seats arranged in coincident relation, curved anchoring plates coöperating with said seats, spring members positioned intermediate said anchoring plates and their seats, bolts extending through said uniting elements, spring members, and anchoring plates, nuts threaded on said bolts, said bolts and nuts being frictionally engaged by said anchoring plates as the latter are pressed outwardly by said spring members, as described.

8. In a rail-joint, the combination with the meeting ends of a pair of rails; of opposite uniting elements bridging their joint and exteriorly formed with adjoining and longitudinally extending concave seats, correspondingly curved anchoring plates coöperating with said seats, spring members positioned intermediate said plates and their seats, and means to draw said uniting elements, spring members and anchoring plates, into binding relation, said means being frictionally engaged by said anchoring plates, as described.

CHAS. ANDREW BELLE ISLE, Sr.

Witness:
JAS. L. MOORE.